(12) United States Patent
Bertrem et al.

(10) Patent No.: US 11,454,328 B2
(45) Date of Patent: Sep. 27, 2022

(54) INDUSTRIAL HIGH PRESSURE HAND VALVE

(71) Applicants: Jeffrey Allen Bertrem, Tulsa, OK (US); Kyle Wayne Rarick, Broken Arrow, OK (US)

(72) Inventors: Jeffrey Allen Bertrem, Tulsa, OK (US); Kyle Wayne Rarick, Broken Arrow, OK (US)

( * ) Notice: Subject to any disclaimer, the term of this patent is extended or adjusted under 35 U.S.C. 154(b) by 0 days.

(21) Appl. No.: 17/017,548

(22) Filed: Sep. 10, 2020

(65) Prior Publication Data

US 2021/0071771 A1  Mar. 11, 2021

Related U.S. Application Data

(60) Provisional application No. 62/898,390, filed on Sep. 10, 2019.

(51) Int. Cl.
| | |
|---|---|
| *F16K 15/18* | (2006.01) |
| *F16K 31/60* | (2006.01) |
| *F16K 25/00* | (2006.01) |

(52) U.S. Cl.
CPC ...... *F16K 15/1823* (2021.08); *F16K 15/1843* (2021.08); *F16K 25/005* (2013.01); *F16K 31/602* (2013.01)

(58) Field of Classification Search
CPC .. F16K 15/1823; F16K 15/1843; F16K 15/04; F16K 15/06; F16K 15/03; F16K 15/182; F16K 15/063; F16K 15/184; F16K 15/1841; F16K 15/1845; F16K 31/602; F16L 29/007; F16L 29/00
See application file for complete search history.

(56) References Cited

U.S. PATENT DOCUMENTS

| | | | | |
|---|---|---|---|---|
| 1,940,932 A | * | 12/1933 | Albertine | F16K 31/602 222/509 |
| 2,680,546 A | * | 6/1954 | Seaberg | F17C 13/04 285/119 |
| 3,791,406 A | * | 2/1974 | Philipps | F16L 29/02 285/239 |
| 6,149,125 A | * | 11/2000 | Nilsson | F16K 15/1823 251/63.4 |

(Continued)

*Primary Examiner* — Kelsey E Cary
(74) *Attorney, Agent, or Firm* — A J D. Martinez; Sherwood, McCormick & Robert

(57) ABSTRACT

A safe, economical, lightweight, ergonomic, and easy to use improved hand valve capable of handling high pressures with either air or liquid media for use in industrial environments. The industrial high pressure hand valve is of the type similar to a floating ball check valve, but with a unique way of achieving the sealing engagement that provides a completely positive shutoff so that absolutely no leakage of the air or liquid media occurs whether operated at high or low pressures. The industrial high pressure hand valve is comprised of a valve body, an ergonomic handle grip, a live swivel, a hose barb, and a nozzle for either air or liquid media. The industrial high pressure hand valve is designed in such a way that other accessory components, such as extended nozzles, can be threadably connected thereto. A handle connected to the valve body controls the flow of the media and when released provides an automatic and completely positive shutoff.

13 Claims, 5 Drawing Sheets

(56) References Cited

U.S. PATENT DOCUMENTS

| | | | | |
|---|---|---|---|---|
| 2010/0263744 | A1* | 10/2010 | Witkowski | F16K 15/03 |
| | | | | 137/527.4 |
| 2011/0247700 | A1* | 10/2011 | Nimberger | F16L 29/007 |
| | | | | 137/15.01 |
| 2013/0056665 | A1* | 3/2013 | Nimberger | F16L 29/007 |
| | | | | 251/251 |
| 2013/0118187 | A1* | 5/2013 | Carrubba | F16L 29/007 |
| | | | | 62/77 |
| 2018/0106407 | A1* | 4/2018 | Bahahlul | F16L 29/00 |
| 2019/0323614 | A1* | 10/2019 | Kang | B05B 11/3074 |
| 2020/0191329 | A1* | 6/2020 | Lusso | F16N 37/02 |
| 2020/0240524 | A1* | 7/2020 | Vignerol | F16K 1/303 |

* cited by examiner

INDUSTRIAL HIGH PRESSURE HAND VALVE

BACKGROUND

The present invention relates generally to ball check valves and more particularly to a floating ball check valve operated by a handle and capable of use in high pressure industrial applications, engineered to have an automatic and completely positive shutoff and for use with multiple media, including but not limited to, water or air.

Valves of the present invention may be broadly defined as check valves, such valves are normally held in the closed position by fluid pressure on the ball-side or system-pressure side of the valve which engages a ball into a sealing engagement with a metallic or plastic valve seat. This sealing engagement blocks the flow of the media—water or air—through an internal bore. A stem or piston may be utilized to engage the ball and forcefully unseat the ball from the valve seat to allow the media to flow through the internal bore to accomplish the desired operation.

The valve of the present invention is better described as a floating ball check valve and should be differentiated from check valves that use spring pressure for biasing the ball into a sealing engagement with the seat. The valve of the present invention does not use a spring to bias the ball into the seat, but rather the ball is free floating and the pressure of the system biases the ball into the sealing engagement with the seat, thereby putting the valve in its closed position. A handle is typically used to engage the stem or piston and unseat the ball from the sealing engagement.

Valves of this type have many uses. Check valves are valves that typically allow fluid or air/gas to flow in only one direction, or unidirectional flow, and they automatically prevent back flow (reverse flow). Check valves are used in a large variety of applications, from household to industrial items. Check valves are also often used to stop the reversal of fluid and air on pumps and compressors.

Both hard and soft seating surfaces are typically used with valves of this type. Metallic or "hard" seating surfaces in a valve generally provide a good seal with a metallic ball when the valve is subjected to high media pressure. However, at low media pressure, the metal-to-metal engagement is frequently not made with sufficient force to stop the leakage of the media past the seal. Soft or plastic material seats on the other hand generally provide good sealing characteristics with a metallic ball if the valve is only utilized in low pressure situations, although the media in the valve may cause deterioration of the soft seat. Further, soft seats are susceptible to material deformation when used at both high and low pressures, which frequently results in subsequent loss of a good low pressure seal and therefore leakage of the media.

Typical check valves are limited in their ability to operate at high pressures while also providing a completely positive shutoff resulting in no leakage of the media. Further, typical valves of this type attempting to operate at high pressures are not user friendly and due to the high pressures under which they operate, may not be safe or safety compliant. Another common issue with valves of this type attempting to operate at high pressures, especially valves utilizing a soft seat, is that when the ball is unseated from the sealing engagement, the soft seat may "blow-out" or otherwise fail.

Prior art devices have attempted to remedy the issues with valves of this kind, but have not been successful. Most prior art devices use a metal ball and a machined radius valve seat in a valve body to try and produce a tight seal; however, this arrangement does not create a leak tight seal as small leakage is typical with air pressure holding the ball in a normally closed position at rest (air continuously escapes between ball & seat in valve).

Therefore, there is a need for an industrial high pressure hand valve usable with multiple media, that is safe, easy to use, ergonomic, and can overcome the disadvantages of the prior art and provide an automatic and entirely positive shutoff so that no leakage of the media occurs whether operated at high or low pressures. The present invention overcomes these disadvantages of the prior art.

SUMMARY

Accordingly, in order to overcome the deficiencies of the prior art, in an exemplary embodiment of the present invention, an industrial high pressure hand valve, which is a floating ball check valve, is provided comprising a valve body, a metallic ball, a Teflon (polytetrafluoroethylene) or PEEK (polyether ether ketone) seat insert, a stem for moving the ball off of the seating/sealing engagement, a handle for controlling the flow of the media through the valve by pushing on the stem, a stem spring for biasing the stem to the closed position, a central bore for the media to flow therethrough, an ergonomic handle grip, interchangeable components based on the intended use of the hand valve, and other aspects that will be detailed herein.

The present invention is capable of being used with multiple media, including air or liquid. The operation of the preferred embodiment of the present invention is simple. When the present invention is in use and connected to air, water, or other media, the hand valve is in a normally closed position as such media provides system pressure which acts upon the ball and holds the ball in a sealing engagement with the seat. When the handle is pressed down by a user, the handle forces the stem to overcome the opposing force of the stem spring, so that the stem mechanically unseats the ball, therefore breaking the sealing engagement and allowing the media to flow through the interior bore/passageway of the valve. When the handle is released by a user, the stem spring forces the stem back up, releasing the ball and allowing the pressure of the system to act upon the ball and return it to the sealing engagement with the seat, providing an automatic shutoff upon the release of the handle. The sealing engagement of the present invention is able to provide a completely positive shutoff, so that there are no leaks of the media being used.

The present invention is able to achieve a completely positive shutoff through the design and specialized installation of the Teflon or PEEK seat insert. This has not been achievable by prior art. The completely positive shutoff is achieved by being able to install the Teflon seat insert using an interference fit. The Teflon or other plastic seat insert has a diameter that is slightly larger than the diameter of the receiving portion of the valve body, so that a specialized installation is required to install the seat insert. The Teflon or plastic seat insert is installed by cooling the seat insert so that it shrinks slightly, and heating the valve body so that it expands slightly, and then press fitting the seat insert into the body. When the temperatures return to ambient temperature, a seal has been formed that allows for a completely positive shutoff, or in other words, no media leaking. While the preferred embodiment uses a Teflon or plastic seat insert, other material types that can achieve the objectives of this invention are within the ambits of the present invention.

Further, the present invention is also engineered to accept and comprised of various add-ons or accessories to the main valve body. These add-ons are interchangeable based on the intended use of the hand valve. In the preferred embodiment of the present invention, the add-ons are connected to the main valve body through threaded connections, although it is within the aspects of this invention to provide for other types of connections. In the preferred embodiment, on the inflow end of the valve body, an ergonomic handle grip is threaded connected to the valve body, a live swivel is threaded connected to the ergonomic handle grip, and a hose barb is threaded connected to the live swivel. On the outflow end of the valve body, a liquid nozzle is threaded connected thereto. In other embodiments, different add-ons may be connected to the valve body depending on the intended use of the hand valve. These add-ons may include, but are not limited to air nozzles, liquid nozzles, extension rods ranging from 1 foot to 6 foot in length, and wand stabilizer grips.

The present invention has many uses, but the preferred embodiment is intended for industrial environments that require a hand valve capable of handling high pressures with either air, water, or other flow media, while also requiring a hand valve that is economical, ergonomic, easy to use, safe and OSHA compliant, and able to achieve a completely positive shutoff (e.g., no leaks). Some of the uses include high pressure wash down, sanitary wash down, cleaning equipment, removing debris, landscaping, and numerous other uses in industrial environments.

It is an object of the present invention to provide a hand valve capable of handling both high and low pressures with various media while providing a completely positive shutoff, i.e. no leaking when the hand valve is in the shutoff position with pressure on the valve in a normally closed position.

It is another object of the present invention to provide a hand valve with an automatic shutoff.

It is another object of the present invention to provide a hand valve that is economical, safe, and user friendly.

It is another object of the present invention to provide a hand valve that can use interchangeable parts and add-ons so that a variety of uses across a variety of industries may be achieved.

It is yet another object of the present invention to provide a hand valve that is lightweight, has a straight thru flow path, a high flow rate, and that can be constructed of various materials of construction depending on the intended use.

While it is to be understood that both the foregoing general description and the following detailed description are exemplary and explanatory only and are not restrictive on the present invention, these and other features, aspects, and advantages of the present invention will become better understood with regard to the following detailed description and accompanying drawings where:

DESCRIPTION

Figure 1:
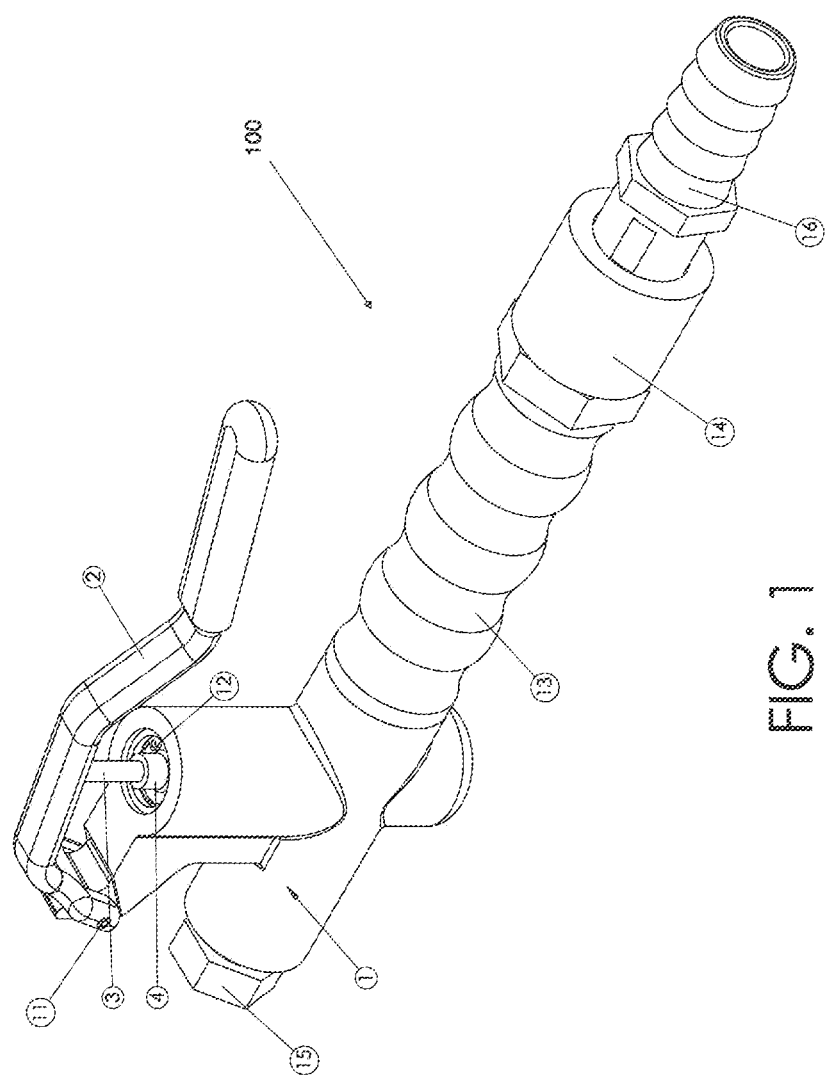
FIG. 1 is a perspective view of a preferred embodiment of the industrial high pressure hand valve of the present invention.
Figure 4:
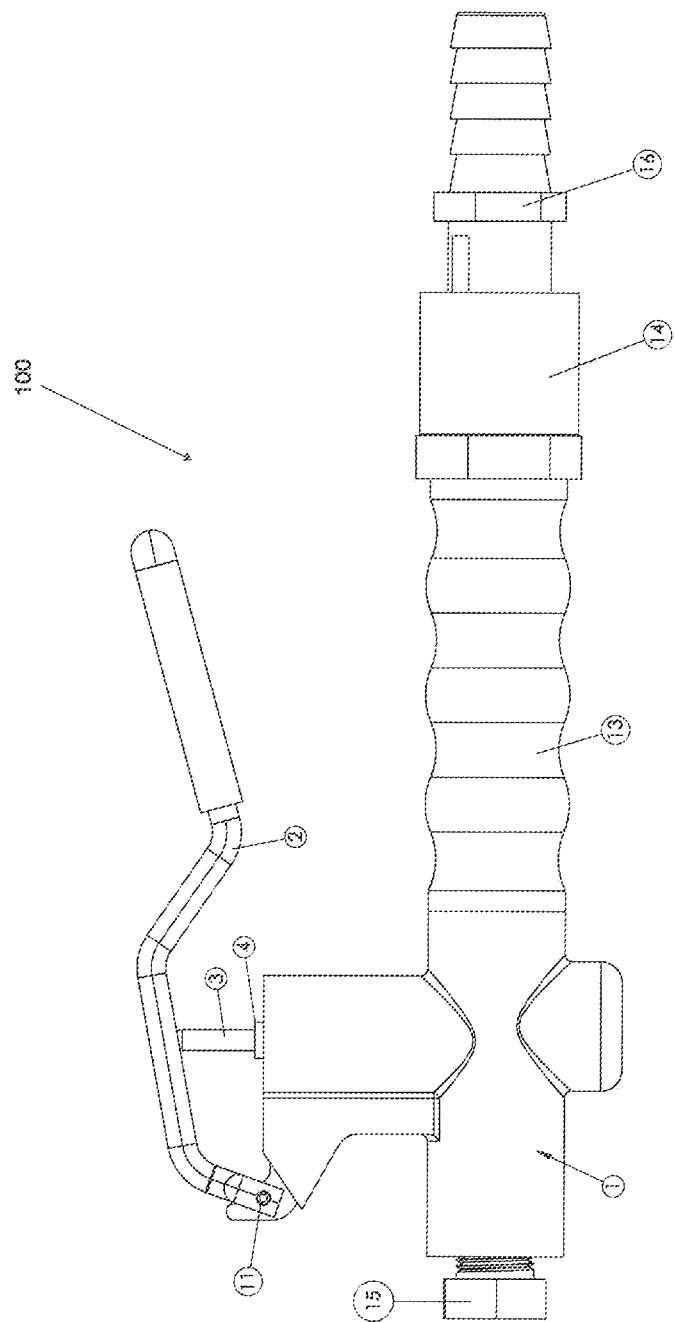
FIG. 4 is a side view of the preferred embodiment of the industrial high pressure hand valve of the present invention.

Referring now to the drawings, reference will be made to the preferred embodiment of the invention, an example of which is illustrated in the accompanying drawings. With reference to FIGS. 1 and 4, a preferred embodiment of the hand valve of the present invention is shown generally at 100, comprising a valve body 1, handle grip 13, a live swivel 14, a hose barb 16, and a liquid nozzle 15. As seen in FIG. 1 from the outside, the valve body 1 is comprised of a handle 2 attached to the valve body 1 via a coiled pin 11, a stem 3, a stem adapter 4, and a retaining ring 12, which retains the stem 3 within the valve body 1.

Figure 2:
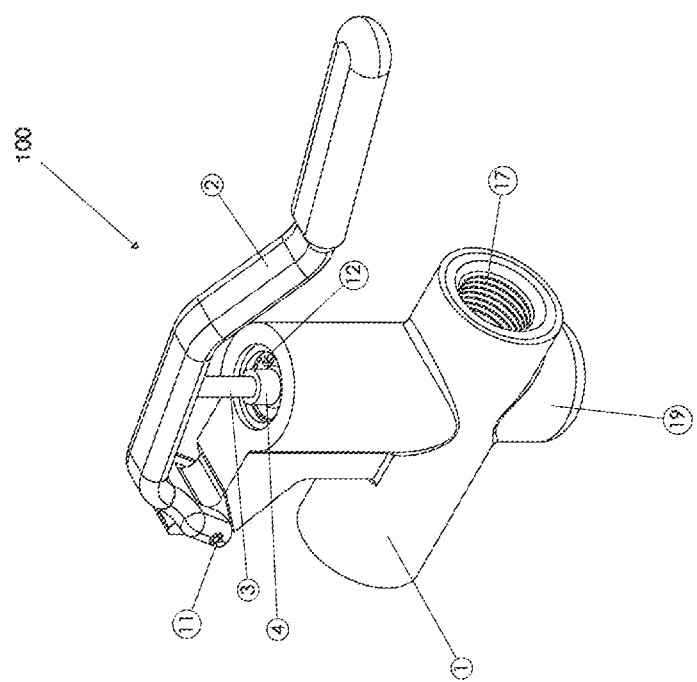
FIG. 2 is a perspective view of the valve body portion of the industrial high pressure hand valve of the present invention.
Figure 3:
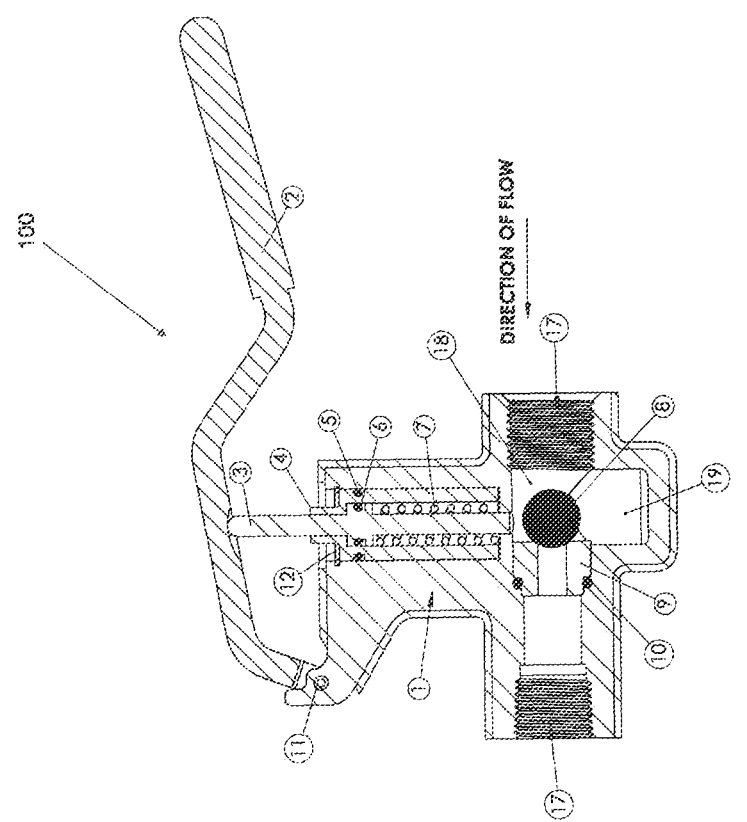
FIG. 3 is a side sectional view of the valve body portion of the industrial high pressure hand valve of the present invention.

FIGS. 2 and 3 further illustrate the components comprising the valve body 1 of the hand valve 100. The valve body 1 is internally threaded 17 at both the inflow and outflow sides. An arrow shows the direction of flow of the media. A ball 8 is housed within a ball receiving bore 18 which includes a recessed portion 19 for when the ball 8 is unseated and the valve is in an open position. The valve body 1 is further comprised of a seat insert 9 which has a seat insert o-ring 10, which goes on the outside step of the seat insert 9 and is captured between the seat insert 9 and valve body 1 once installed providing an extra seal if the interference fit fails thereby providing further leak protecting and a tighter seal between the seat insert 9 and the valve body 1. The valve body 1 is further comprised of a handle 2, connected to the valve body by a coiled pin 11.

In use, the handle 2 is compressed by a user so that the hand valve is in its open position thereby allowing the media to flow freely through the interior passageway/bore of the hand valve. When the handle 2 is compressed, it puts a downward axial force on the stem 3 which overcomes the upward force provided by the stem spring 7 thereby the stem 3 mechanically unseats the ball 8 from the valve seat insert 9 pushing the ball 8 into the recessed portion 19, thereby allowing the media to flow freely straight through the valve bore. The stem 3 is slidably connected to the valve body 1 through the use of a stem adapter 4 and held in place by a retaining ring 12. The stem 3 is sealed with the use of a stem adapted o-ring 5 used on the retaining cylinder and a stem o-ring 6 used on the stem or piston. When the handle 2 is released by a user, the upward force provided by the stem spring 7 forces the stem 3 back up, releasing the ball 8 and allowing the pressure of the system to act upon the ball 8 and return it to the sealing engagement with the seat insert 9, providing an automatic shutoff upon the release of the handle 2. The unique and novel sealing engagement of the present invention is able to provide a completely positive shutoff, so that there are no leaks of the media.

The completely positive shutoff is achieved through a specialized seating method of installation of the seat insert 9 and the seat insert O-ring 10. The completely positive shutoff is achieved by being able to install the seat insert 9 using an interference fit. The seat insert 9 has a diameter that is slightly larger than the diameter of the receiving portion of the valve body, so that the specialized installation is required to install the seat insert 9. The seat insert 9 is installed by cooling the seat insert 9 & 10 O-ring to a sufficient temperature so that it shrinks slightly, and heating the valve body 1 to a sufficient temperature so that it expands slightly, and then press fitting the seat insert into the body. When the components return to ambient temperature, a seal has been formed that allows for a completely positive shutoff, or in other words, no leaking. The preferred embodiment uses a Teflon or plastic seat insert, however, other material types that can achieve the objectives of this invention are within the ambits of the present invention.

The seat insert 9 in the preferred embodiment is preferably made of Teflon or other plastic, but other materials which will achieve the benefits of the present invention are contemplated by the present invention. The valve body 1 is preferably made of ASTM A743 CF16FA 303SS or ASTM A351 CF8M (316 SS), the stem 3 is preferably made of 17-4 stainless steel, the stem spring 7 material is preferably Inconel, and the stem adapter 4 material is preferably 303 stainless steel. However, as discussed, it is within the ambits of the present invention that any suitable material may be used to accomplish the objects of the present invention. The ball 8 used in the preferred embodiment is preferably made of 420 C SS or a similar hard metal.

Figure 5:
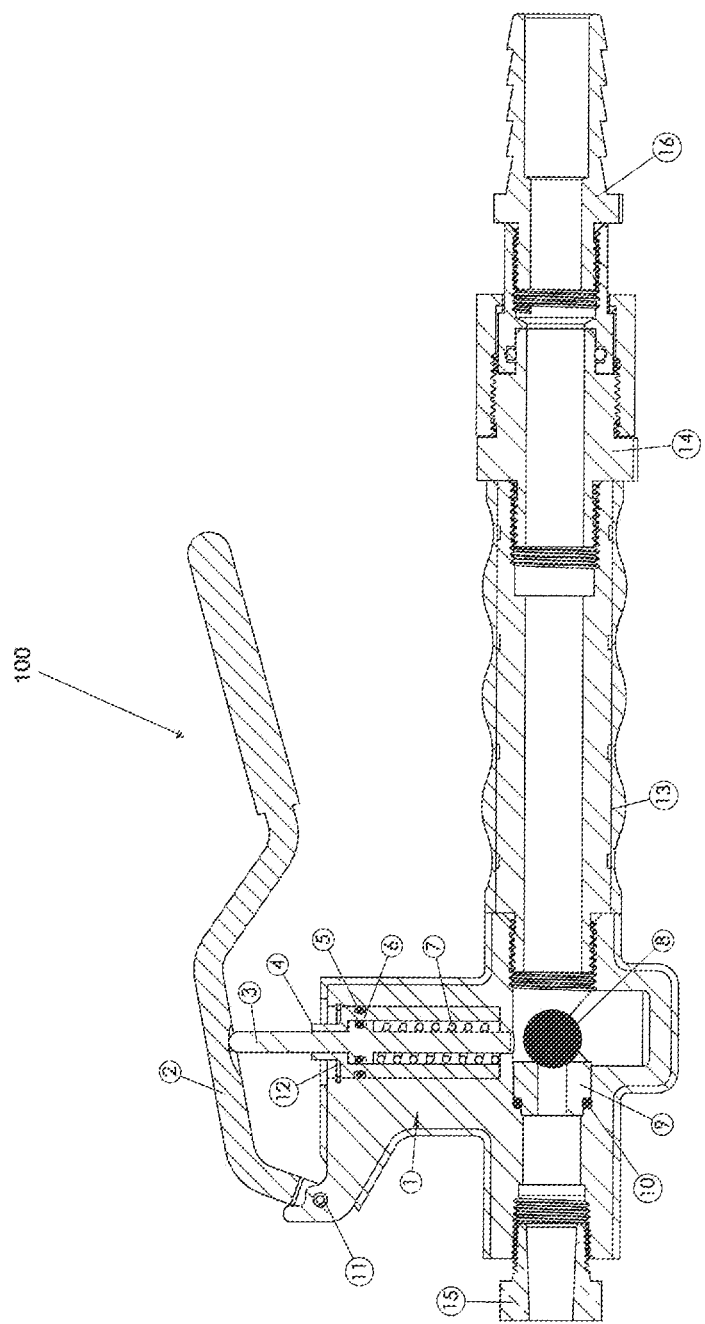
FIG. 5 is a side sectional view of the preferred embodiment of the industrial high pressure hand valve of the present invention.

While the drawings, specifically FIGS. 1, 4 and 5, depicting the preferred embodiment of the present invention depict the ergonomic handle grip 13, the live swivel 14, the hose barb 16, and the liquid nozzle 15 being attached and utilized with the valve body 1, other connections or add-ons may be threadably connected to the valve body 1 depending on the nature of use of the hand valve 100, including extended nozzles, different nozzles for air or other media, and a variety of other connections.

Various changes, alternatives and modifications may become apparent to one of ordinary skill in the art following a reading of the foregoing specification. It is intended that any such changes, alternatives, and modifications within the scope of the appended claims be considered a part of the present invention. Further, it is within the ambit of the present invention to cover any obvious modifications of the preferred embodiment described herein.

What is claimed is:

1. An industrial high pressure hand valve that provides a completely positive shutoff comprising:
    a valve body;
    a handle grip;
    a live swivel;
    a hose barb;
    a nozzle;
    wherein the valve body is comprised of a handle attached to the valve body via a coiled pin, a stem, a stem adapter, a stem spring, and a retaining ring which retains the stem within the valve body;
    wherein said valve body is further comprised of an internal bore to allow for the flow of media through the valve body, internal threads located at the inflow and outflow ends of the valve body for connecting of said handle grip and nozzle thereto, a metallic ball contained within a ball receiving bore of the valve body which includes a recessed portion for when the valve is in an open position and the metallic ball is unseated, a seat insert, and seat insert O-ring;
    wherein said seat insert has a diameter that is slightly larger than the diameter of a seat insert receiving portion of the valve body so that an interference fit must be used to install the seat insert and seat insert O-ring;
    wherein said interference fit is achieved by cooling the seat insert and seat insert O-ring to a temperature sufficient to shrink said seat insert and seat insert O-ring slightly and by heating the valve body to a temperature sufficient for said valve body to expand slightly; said seat insert and seat insert O-ring are press fitted into the receiving portion of the valve body and once the temperature of all said seat insert, said seat insert o-ring, and said valve body returns to ambient temperature, said interference fit has been achieved;
    wherein said stem is slidably connected to the valve body via the stem adapter and the retaining ring and sealed against media leakage via the use of a stem o-ring;
    wherein said nozzle is comprised of the nozzle for either air media or liquid media;
    wherein said valve body, handle grip, live swivel, hose barb, and nozzle all contain an internal bore or passageway to allow for the flow of media therethrough;
    wherein said valve body, handle grip, live swivel, hose barb, and nozzle are threadably connected.

2. The industrial high pressure hand valve of claim 1, wherein flow of either air or liquid media is controlled by compressing or releasing the handle attached to the valve body, wherein when the handle is compressed, a downward axial force is put on the stem which overcomes an upward axial force of the stem spring and the stem mechanically unseats the metallic ball from the seat insert pushing the metallic ball into the recessed portion of the valve body and allowing the media to flow therethrough and when the handle is released, the upward axial force of the stem spring forces the stem back up, releasing the metallic ball to return to a sealing engagement with the seat insert stopping the flow of the media therethrough, providing an automatic shutoff when the handle is released.

3. The industrial high pressure hand valve of claim 2, wherein the seat insert is comprised of Teflon (polytetrafluoroethylene), PEEK (polyether ether ketone), or another thermoplastic polymer.

4. The industrial high pressure hand valve of claim 2, wherein said interference fit creates a seal that creates a completely positive shutoff and does not allow any leaking of air or liquid media.

5. The industrial high pressure hand valve of claim 2, wherein additional accessories such as extension rods, a wand stabilizer grip, and different nozzles are threadably connected to the valve body.

6. The industrial high pressure hand valve of claim 2, wherein the valve body and handle are comprised of 316 stainless steel.

7. The industrial high pressure hand valve of claim 2, wherein the metallic ball is comprised of 420 C stainless steel.

8. The industrial high pressure hand valve of claim 2, wherein the stem is comprised of 17-4PHH1150 stainless steel.

9. The industrial high pressure hand valve of claim 2, wherein the live swivel is comprised of 303 stainless steel.

10. The industrial high pressure hand valve of claim 2, wherein the hose barb is comprised of 316 or 316L stainless steel.

11. The industrial high pressure hand valve of claim 2, wherein the handle grip is comprised of 304 stainless steel.

12. The industrial high pressure hand valve of claim 2, wherein the nozzle for air media is comprised of 316 or 316L stainless steel and the nozzle for liquid media is comprised of brass.

13. The industrial high pressure hand valve of claim 2, wherein the maximum media pressure is equal to 150 psig.

* * * * *